United States Patent Office 3,563,005
Patented Feb. 16, 1971

3,563,005
APPARATUS FOR EXTRACTING SMOKE AND GREASE ELEMENTS FROM COMBUSTION GASES
James N. Jones, Memphis, Tenn., assignor of forty percent to William R. Tudor, Birmingham, Ala.
Filed Oct. 22, 1968, Ser. No. 769,524
Int. Cl. B01d *47/06*
U.S. Cl. 55—228     8 Claims

ABSTRACT OF THE DISCLOSURE

Smoke and grease particle extracting apparatus particularly useful in commercial kitchen installations and in the ventilator or exhaust system in such kitchen installation. The apparatus includes means for collecting and rendering the grease particles in thickened solid form for readily disposing of the thickened grease in waste or for further processing. The structure includes a cleaner unit having a hollow housing having an inlet and an outlet opening permitting passage of grease-particle-laden combustion gases and elements to pass into and out of the hollow interior of the cleaner unit. The apparatus includes selectively shiftable filter means arranged in the interior of the cleaner unit and such filter means which may be selectively arranged across the inlet or across the outlet opening of the cleaner housing. When the filter is arranged over the inlet of the cleaner unit housing, grease and foreign particles are filtered out of the combustion gases and constrained in the filter. When the filter is arranged over the outlet opening of the cleaner unit housing, hot water or hot detergent liquid passes through the filter in a reverse or opposite direction thereby dislodging the grease and foreign material constrained in the filter. Water issuing from the nozzles in the interior of the cleaning unit provide flushing means for heating and flushing the grease substances from the filter mass. Provided also in the apparatus is a grease intercepting or collecting tank for collecting the hot water and grease for subsequent reuse or disposal.

BACKGROUND OF THE INVENTION

(1) Field of the invention

Relates to combustion gas filtering apparatuses generally and particularly to such apparatus utilized in commercial kitchen installations for filtering and disposing of grease collections coagulating in the exhaust or ventilating apparatus of the kitchen installation.

(2) Description of the prior art

In commercial kitchen installations or in short order grill type installations a very significant problem exists in properly or effectively exhausting the cooking and combustion gases to the outside atmosphere. A typical kitchen installation will include a range hood or Ventahood system which includes a filter and fan means for drawing the combustion and cooking gases through the filter and into the outside atmosphere. A problem of substantial significance is that of finding a way for effectively handling the grease particles and the coagulated or solidified grease substances in the exhaust or ventilator system.

Grease collections in a ventilator system present several significant problems: (1) The grease collecting on the various parts of a kitchen ventilator system is difficult to remove and clean the parts properly. Prior art practices in removing grease collections typically are carried out by hand manipulation of scraping tools, flame type heating units or other hand manipulated devices. Such slow and awkward cleaning procedures are generally ineffective and interrupt the normal course of business for the kitchen or cooking installation. (2) A substantial fire hazard exists in the collection of grease substances in the exhaust or ventilator system of a kitchen installation. Grease fires in the flues or exhaust passageways of a kitchen exhaust system are not unusual, in fact, many such installations include automatic or manually actuated fire control means arranged in the flue and exhaust system for extinguishing a grease fire in the system. Many municipalities have ordinances or regulations controlling the structure and operation of such kitchen exhaust systems. Fire department personnel in many municipalities make periodic checks on such establishments to insure that proper equipment and operation is being utilized. (3) A further problem is that of assuring proper disposal of the grease substances. Unsanitary and hazardous conditions often are brought about by dumping or introducing grease substances or greasebearing liquids into the drain or sewage system of a municipality. The grease substances or grease-bearing liquids tend to restrict the flow of liquid through the drain lines and also cause unsanitary conditions and breeding places for unwanted bacteria, flies, bugs, rodents or the like. (4) Also, the used fats or grease materials from a cooking unit may be utilized for commercial or manufacturing processes; the burning or draining off of the fat or grease substances of food cooking results in substantial waste.

SUMMARY OF THE INVENTION

The vaporized grease particles and combustion gases rising from a cooking stove are conducted through a hollow-shelled cleaning unit having a movable filter, and passing from the cleaning unit are collected in a grease-collecting tank where the grease substances may be removed as waste or for manufacture or commercial use. An important feature of the present invention resides in the movable mounting of a filter in the interior of the cleaning unit. The movable filer may be selectively moved to a first or operating position wherein the flow of combustion gases enter from one side of the filter and to a second or cleaning position in which hot water or hot detergent liquid is caused to flow through the filter in a reverse direction from the normal flow of gases through the filter for dislodging the filtered particles constrained in the filter mass and for moving the particles to the collection tank.

The collection tank slows down the passage of liquid and allows time for the liquid to cool and the grease substances to rise to the upper level of the tank and to be removed for commercial or manufacturing use. The apparatus includes also a continuous loop or circuit for reusing the detergent hot liquid in the cleaning action on the filter and associated passageway parts of the apparatus. Anti-bacterial enzymes also preferably are introduced in the water or detergent liquid for arresting the growth of bacteria in the apparatus, for promoting sanitary conditions in the apparatus and food handling establishment, and for breaking the grease down so that it will flow.

DESCRIPTION OF THE PREFERRED EMBODIMENT

Figure 1:
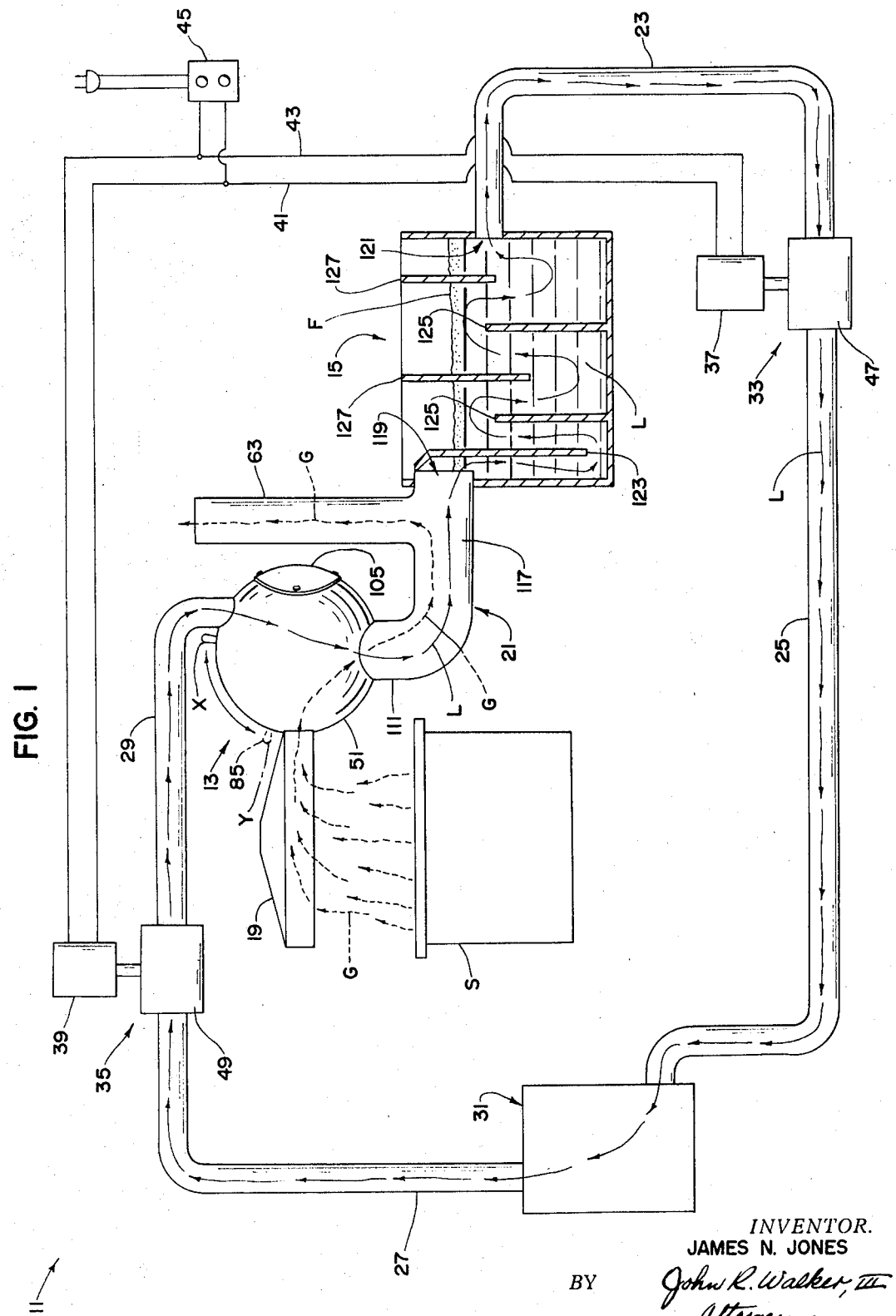
FIG. 1 is a schematic view of the apparatus of the present invention.

The apparatus for extracting smoke and grease from combustion and cooking gases in indicated by numeral 11 and is adapted to be used in conjunction with a typical grill or cooking stove indicated S in FIG. 1. Apparatus 11 basically includes a cleaning unit 13; a grease-collecting tank 15, hood means 19 for conducting the cooking gases from cooking stove S to cleaning unit 13; second flue means 21 for conducting cooking gases from cleaning unit 13 to the atmosphere; and liquid conduit circuit means adapted for continuous circulation of liquid through cleaning unit 13 and tank 15 including conduit means 23, 25, 27, 29, a heater unit 31, and pump means 33, 35. Electric pump motors 37, 39 energized through electric leads 41, 43 and selectively operable through switch 45 actuate pump mechanisms 47, 49 and propel heated cleaning liquid L through conduit means 23, 25, 27, 29 and heater 31 in an endless recirculatory manner.

Cleaning unit 13 is generally sphere-shaped and includes wall structure defining a housing 51 enclosing a generally spherical interior 52. Housing 51 includes a horizontally opening inlet 53 communicating with hood means 19 and a generally vertically downwardly opening outlet 55 communicating with second flue means 21. A fan unit including a bladed rotor 57 and electric drive motor means 59 is supported by support members 61 in interior 52 of cleaning unit housing 51. Fan rotor 57 is supported and driven on a vertical axis and may include shroud means (not shown) for forcing air downwardly through second flue means 21 and into the atmosphere through vertical chimney 63. Fan unit rotor 57 is operative for causing flow of combustion and cooking gases through hood means 19, into the interior of cleaner housing 51, out of the housing and through second flue means 21 and into the atmosphere.

A filter element 65 is movably mounted in interior 52 of cleaning unit housing 51 and is adapted to be selectively moved to a position across inlet opening 53 or outlet opening 55. Filter element 65 is generally thick rectangular in form and includes oppositely facing sides including a forward flow side 67 and rearward flow side 69. Filter 65 is of any suitable construction, as for example, fiberglass. Filter 65 is adapted to be arranged selectively at a first position whereat the filter is arranged substantially across inlet opening 53 and with the combustion gases passing through the filter mass from forward flow side 67 or the filter element is adapted to be arranged in a second position whereat the filter is arranged substantially fully across outlet opening 55 and in such a manner that the filter may be flushed by hot water or hot detergent liquid passing therethrough from reverse flow side 69 and into second flue means 21 in a manner which will be better understood in the description to follow later in the specification.

Cleaning unit 13 preferably includes valve means including a selectively operative door or gate element 71 adapted for opening or closing off cooking and combustion gas flow through opening 53. Filter 65 and gate 71 preferably are operatively connected together for simultaneously operative movement. A generally long carriage structure 73 configured generally in a plane curve firmly interconnects filter 65 and gate element 71; filter 65 and gate element 71 are firmly mounted respectively on opposite end portions of carriage structure 73 and are adapted for simultaneous movement respectively between said first and second positions.

A plurality of opposingly paired guideway blocks 75, 77 engage respectively the laterally transverse opposite edge portions of carriage structure 73 and provide guideway means for arced movement of the carriage structure upwardly and downwardly within the interior of cleaning unit housing 51. Paired guideway blocks 75 are arranged in the lower hemispheric portion of housing 51 and are firmly secured respectively by screw fasteners 79 on the lower wall structure of the cleaning unit housing. Carriage structure 73 preferably has firmly secured on opposite lateral edge portions thereof oppositely facing T-sectioned runner portions 81. The runner portions engage corresponding T-shaped grooves in guideway blocks 75, 77 and provide sealing guideway means for the arced upward and downward movement of movable assembly 65, 71, 73.

Manually operative actuating means including a vertical slot 83 formed in housing 51 and arranged directly over carriage structure 73, and a hand grip member 85 provide means for manipulating filter, gate and carriage assembly 65, 71, 73 upwardly and downwardly between first and second positions. Hand grip 85 projects perpendicularly from the distal end of gate element 71 and includes a shank portion 87 adapted to move lengthwise in vertical slot 83 in the wall structure of housing 51. Hand grip 85 is adapted to be moved to and from a first position indicated X and a second position indicated Y (see FIG. 1).

Figure 4:
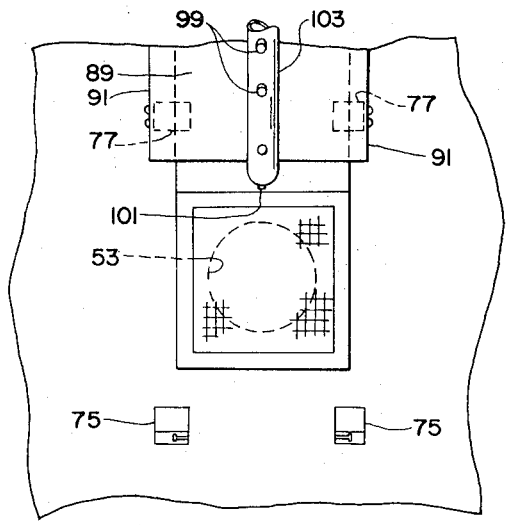
FIG. 4 is a vertical plane sectional view of a portion of the cleaning unit taken on the line IV—IV of FIG. 2.
Figure 5:
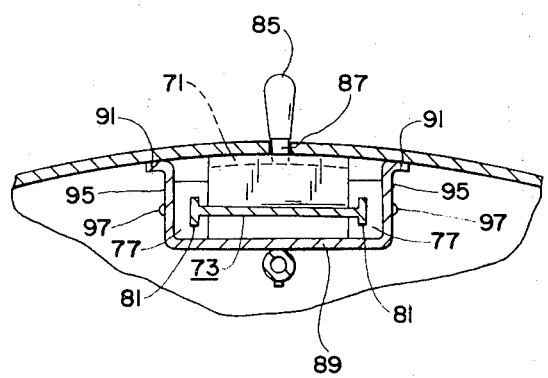
FIG. 5 is a sectional view taken as on the line V—V of FIG. 2.
Figure 6:
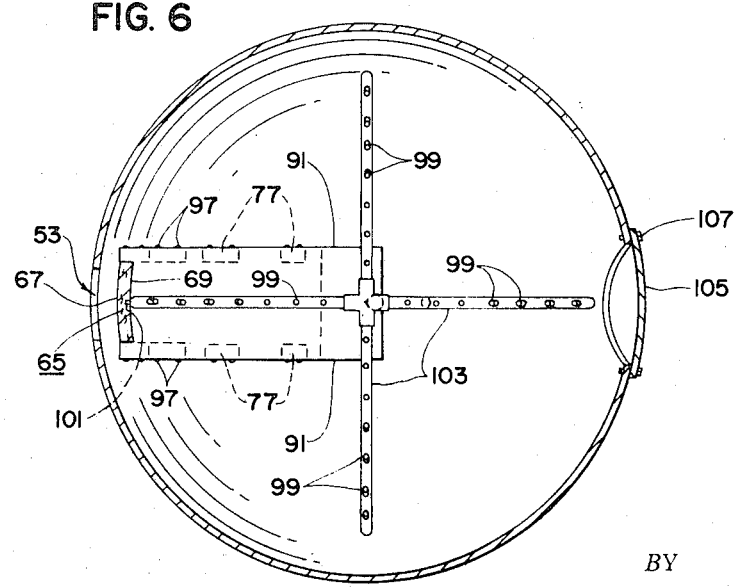
FIG. 6 is a vertical plane sectional view as viewed upwardly, of the upper interior of the cleaning unit taken as on the line VI—VI of FIG. 2.

A U-sectioned longitudinally curved support 89 is fixedly secured to the upper interior wall surfaces of cleaning unit housing 51 along bead portions 91 (see FIGS. 4 and 5). The lower end of longitudinally curved U-section support 89 is open and permits vertical arced movement of carriage structure 73 and gate element 71 as assembly 65, 71, 73 is moved between first and second positions. The upper end portion of support 89 is closed off by a radially extending end wall 93 fixedly secured on the interior upper surface of housing wall structure 51 adjacent the terminus of hand grip slot 83 (see FIG. 2). Parallel vertically arranged sidewall portions 95 of support 89 provide support means for upper guideway blocks 77; the opposingly arranged guideway blocks are fixedly secured in transversely paired arrangement by threaded fasteners 97 passing through support sidewall portions 95 and engaging guideway blocks 77 (see FIGS. 4 and 5).

The operation of cleaning unit 13 is such that when filter 65 is in its first position and arranged over inlet opening 53, gate 71 is arranged at its first position in the upper portion of the cleaning unit and is inoperative. When filter 65 is arranged over outlet opening 55 and a reverse flow of cleaning liquid is flowing through the filter, gate 71 is arranged over inlet opening 53 and occludes passageway of gases through inlet opening 53.

Nozzle means preferably in the form of a plurality of spray nozzles 99, 101 are arranged in the upper interior of cleaner housing 51 and provide hot water detergent means in the housing interior for flushing grease substances and foreign material from the housing through second flue means 21 and into collecting tank 15. Spray nozzles 99 are intermittently spaced along the longitudinal extensions of tubular X-shaped tubular projections 103 and are generally oriented downwardly and toward the interior wall surfaces of housing 51. Spray nozzle 101 is fitted on the distal end portion of that projection 103 arranged adjacent U-sectioned support 89 and is directed downwardly. Nozzle 101 is adapted to spray water or detergent liquid through the filter 65 when the filter is arranged over inlet 53 and serves to saturate the filter and to augment the cleaning action of the filter. The downstream portion of conduit 29 is connected with one of tubular projections 103 and feeds the hot water or cleaning liquid into the four projections 103 and at equal pressure through spray nozzles 99, 101.

An inspection door 105 secured with bolts 107 on housing 51 provides inspection and access means into the interior of cleaning unit housing 51. An inner or double concave bottom 109 of housing 51 is provided around outlet 55 to give a substantially close fit around filter element 65 when in said second position over outlet 55.

Flue sections 111, 117 of second flue means 21 provide dual passageway means or means for conducting simultaneously cleaning liquid L and cooking gases G (see full line and broken line arrow indications in FIG. 1). Although other conduit constructions may be utilized, perhaps incorporating separate flow passageways respectively for the liquid and gas elements, the preferred form of the invention is illustrated, and such form whereby the gases and liquid are conducted though the same conduit, namely, flue sections 111, 117 of second flue means 21. Since liquid L flows only in the lower portion of horizontal flue sections 117 sufficient space is provided in the conduit for passageway means of the combustion gases which exit into the atmosphere through chimney conduit 63.

Cleaning liquid L passes through flue section 117, enters the interior of tank 15 through inlet 119 and is conducted from the tank by passage through outlet 121 and into liquid conduit 23. A plurality of baffle plates 123, 125, 127 are arranged in the interior of tank 15 transversely of the flow of liquid through the tank. Baffles 123, 125, 127 cause vertical liquid currents in flow of the liquid through tank 15. Such movement of the fluid (from left to right as viewed in FIG. 1) provides sufficient time for the fluid to cool and the liquid fat or globules of grease F to coagulate and float to the top of the liquid. The cooler liquid in the tank (that portion of the liquid toward the right as viewed in FIG. 1) supports the fat or grease substances on the surface level of the liquid from whence it may be scooped or otherwise removed through the open top of the tank. The fat grease substances F removed from the liquid surface may be discarded as waste or may be utilized for forming certain commercial or manufactured products.

The cleaning fluid preferably is pumped continuously through conduit means 23, 25, 27, 29, not only when hand grip 85 is arranged in the lower position (position indicated Y in FIG. 1) but is also preferably continuously pumped through the apparatus when filter 65 is arranged across inlet opening 53 of cleaning unit housing 51. Although a closed loop continuously operative conduit circuit 23, 25, 27, 29 is illustrated and is the preferred liquid supply means of the invention, other liquid supply means not utilizing a continuous flow circuit may be desirable in certain applications of the invention. In certain applications of the invention it may be desirable to utilize the city main pressure of a city water system and such apparatus which may dispense with the pump means 37, 39. Such changes above mentioned are believed to be well within the scope of the workmen skilled in the art.

Figure 2:
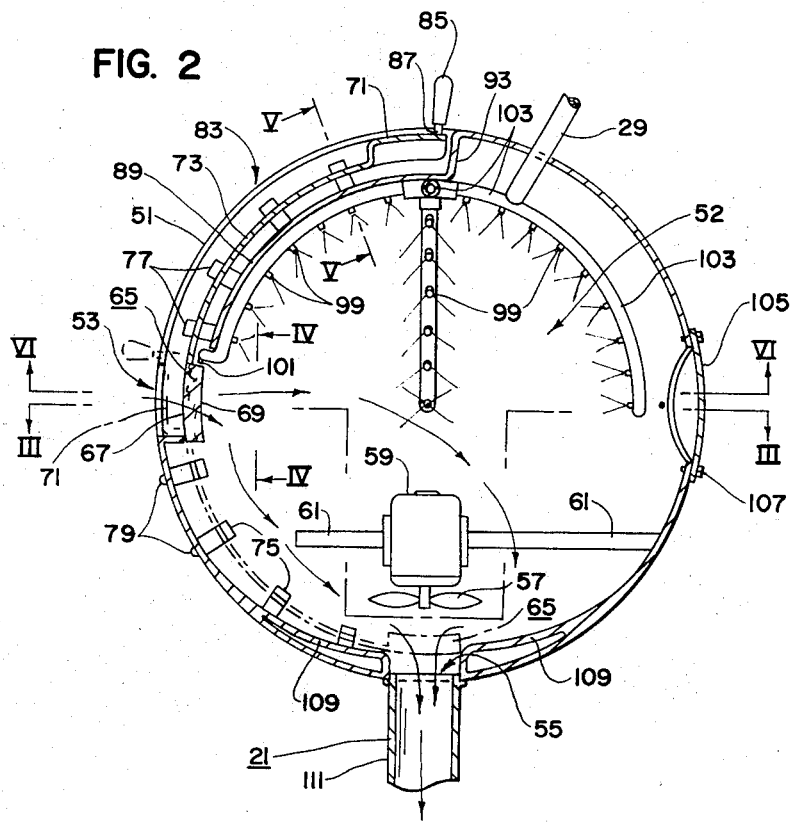
FIG. 2 is a vertical plane sectional view of the cleaning unit of the apparatus.
Figure 3:
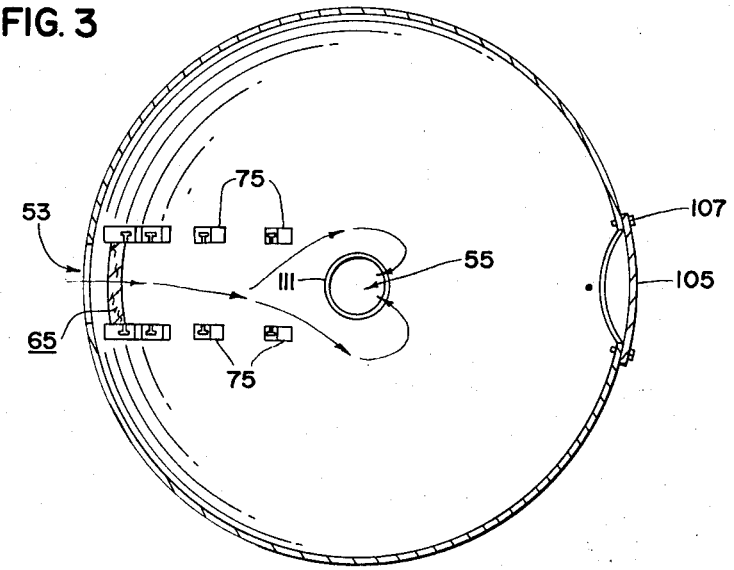
FIG. 3 is a horizontal broken plane sectional view of the cleaning unit taken as on the line III—III of FIG. 2.

It will be understood that in the normal operation of apparatus 11, the filter 65, gate 71, carriage 73 and handle 85 are in the heretofore-mentioned first or operating position as shown in solid lines in FIG. 2. Then, when it is desired to clean filter 65, assembly 65, 71, 73 is moved downwardly by pulling downwardly on handle 85 until the assembly is in the heretofore-mentioned second or cleaning position, shown in dotted lines in FIG. 2, and in which position filter 65 is over outlet 55 and gate 71 is over inlet 53. Then, with the assembly 65, 71, 73 in said second position, the filter 65 is flushed by means of the hot water or hot detergent liquid from nozzles 99 flowing down through the filter while the gate 71 closes off the inlet opening 53. Preferably, the water or detergent pressure is increased by means not shown to cause a great flow of the water or liquid to flush the filter. Next, when the filter 65 has been flushed, assembly 65, 71, 73 is moved back into said operating position until time for the next filter cleaning.

I claim:

1. Apparatus for extracting smoke and grease elements from gases of combustion especially such substances emitted from a food cooking unit, the apparatus comprising a cleaner unit including wall structure defining a housing having substantially a fully enclosed interior, an inlet opening and an outlet opening in the wall structure of said housing; a grease collecting tank having an inlet opening and an outlet opening, hood means for conducting the gases and elements of combustion from said cooking unit, through said inlet opening of said cleaner housing, and into the interior of said housing; flue means for conducting the gases and elements of combustion from the interior of said cleaner housing through said outlet opening and to the atmosphere, fan means for moving combustion gases from the cooking unit, through said hood means, into the interior of said cleaner housing, and out of said housing, through said flue means and into the atmosphere; a filter adapted for straining and constraining vaporized grease particles and combustion substances from the combustion gases, and with said filter having a forward flow side and a reverse flow side, support means supporting said filter in the interior of said cleaner housing and guidingly constraining said filter in movement between a first position whereat said filter is arranged substantially fully across the housing inlet opening with the flow of gases passing through said filter from said forward flow side, and a second position whereat said filter is arranged substantially fully across the housing outlet opening, actuating means selectively operable for arranging said filter in said first or second position, liquid nozzle means arranged in the interior of said housing, liquid supply means for introducing liquid through said nozzle means and into the interior of said cleaner housing for passage through said filter from said reverse flow side when in said second position, and liquid conduit means communicating the outlet opening of said housing with the inlet opening of said grease-collecting tank.

2. The apparatus of claim 1 wherein said fan means includes a power-driven bladed rotor arranged in the interior of said cleaner housing for propelling the combustion gases from said hood means, into the interior of said cleaner housing, and out of said housing, through said flue means and into the atmosphere.

3. The apparatus of claim 1 which additionally includes gate means selectively operable for opening or closing off combustion gas flow through said inlet opening.

4. The apparatus of claim 3 wherein said gate means includes a gate, and support means supporting said gate in the interior of said cleaner housing and guidingly constraining said gate in movement between a first position whereat said gate is arranged remote from said housing inlet opening and a second position whereat said gate is arranged fully across said housing inlet opening.

5. The apparatus of claim 4 which additionally includes means operatively connecting said filter and said gate together for simultaneously operative movement, and such means whereby when said filter is in said first position and arranged over said cleaner housing inlet opening said gate is arranged in its first position and arranged remote from said housing inlet opening, and when said filter is arranged over said outlet opening and is disposed in its second position, said gate is arranged over said inlet opening and is disposed in its second position.

6. The apparatus of claim 5 wherein said cleaner housing is substantially in the shape of a sphere, said inlet opening opens horizontally and is arranged in a side portion of the wall structure of said housing and said outlet opening opens vertically downwardly and is in the lower portion of said housing, and with said means operatively connecting said filter and said gate being in the form of a generally long longitudinally curved carriage structure arranged substantially uniformly contiguous the inside wall surfaces of the interior of said housing with said filter and gate being firmly secured respectively on opposite ends of said curved carriage structure, and wherein said means guidingly constraining said filter and gate includes confronting grooved guideway structure engageable respectively with the oppositely oriented longitudinally extending edge portions of said carriage, and wherein said actuating means includes hand grip means operatively connected with said carriage an extending outside said cleaner housing for manual manipulation of said filter mass and gate between said first and second positions.

7. The apparatus of claim 1 wherein said grease collecting tank includes a plurality of baffle plates arranged transversely of the flow of liquid through said tank and extending respectively above the level of the liquid in the tank, the tank being operative for intercepting the grease anad combustion substances between the baffle plates from whence the grease may be periodically removed from the tank.

8. The apparatus of claim 1 wherein said liquid supply means includes liquid conduit circuit means adapted for endless continuous circulation of liquid and continuous recirculation of liquid through said cleaner and said grease tank, powered pump means for propelling the liquid through said liquid conduit circuit means, and heater means arranged in that part of said circuit means substantially immediately upstream from said nozzle means for heating the liquid issuing from said nozzle means.

References Cited

UNITED STATES PATENTS

| | | | |
|---|---|---|---|
| 2,583,252 | 1/1952 | Carraway | 126—299(A) |
| 3,242,652 | 3/1966 | Malenchini | 55—228X |
| 3,494,108 | 2/1970 | Moragne | 55—228X |

TIM R. MILES, Primary Examiner

V. H. GIFFORD, Assistant Examiner

U.S. Cl. X.R.

55—242; 98—115; 126—299